Feb. 22, 1938. H. KOTT 2,109,235
RADIATION FILTER AND METHOD FOR UTILIZING THE SAME
Filed June 29, 1935 2 Sheets-Sheet 2
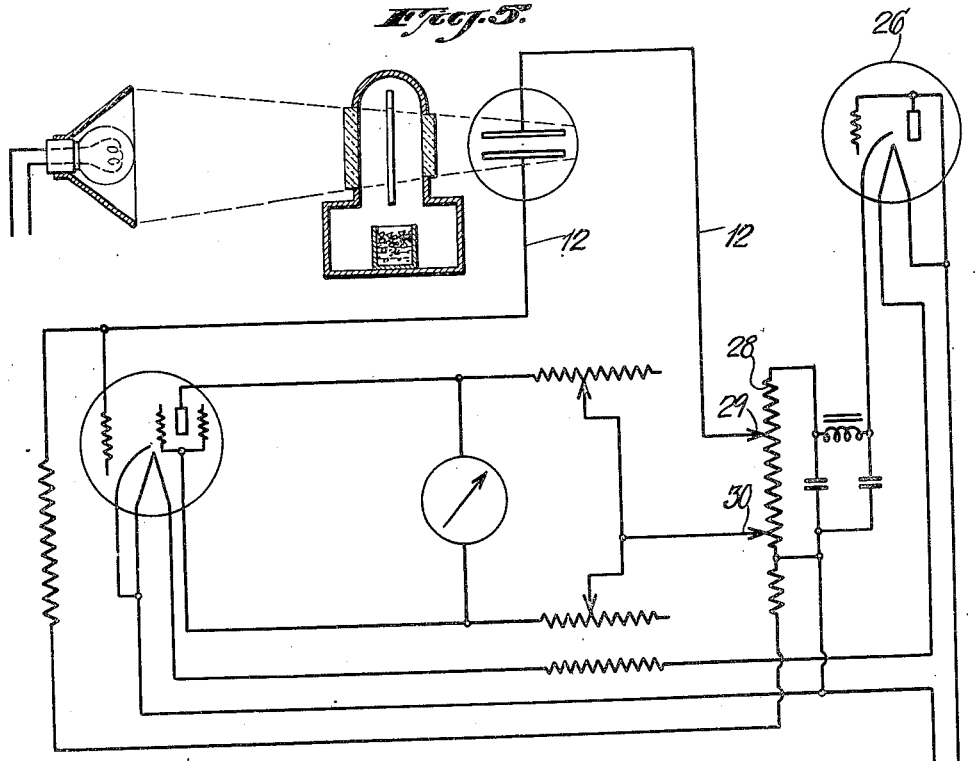
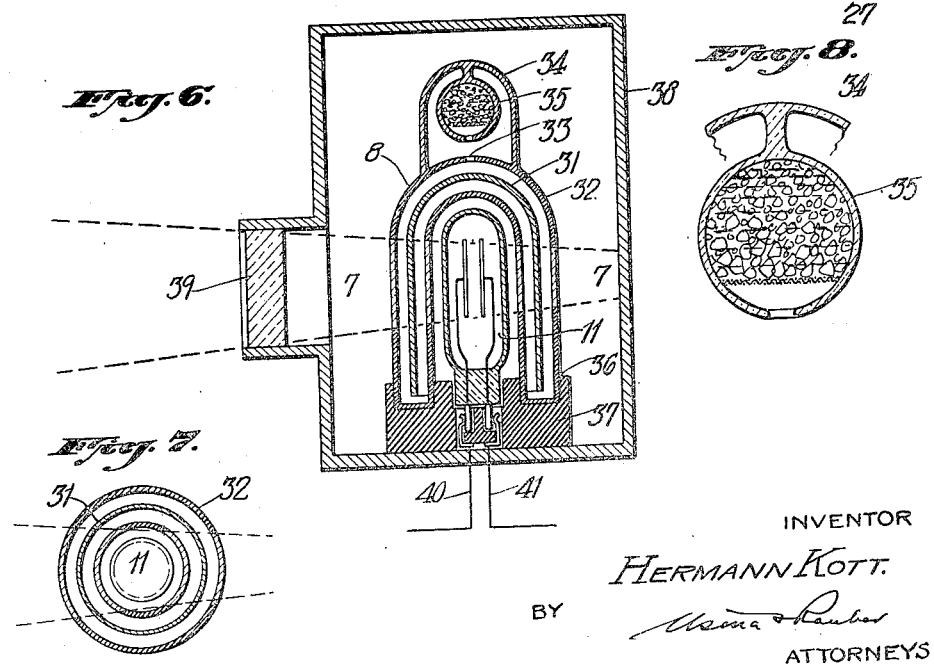
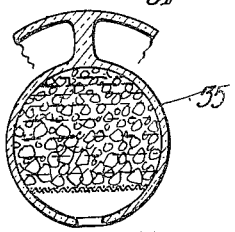
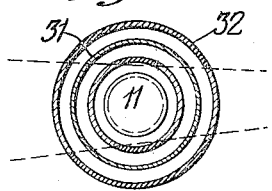
INVENTOR
HERMANN KOTT.
BY
ATTORNEYS Patented Feb. 22, 1938

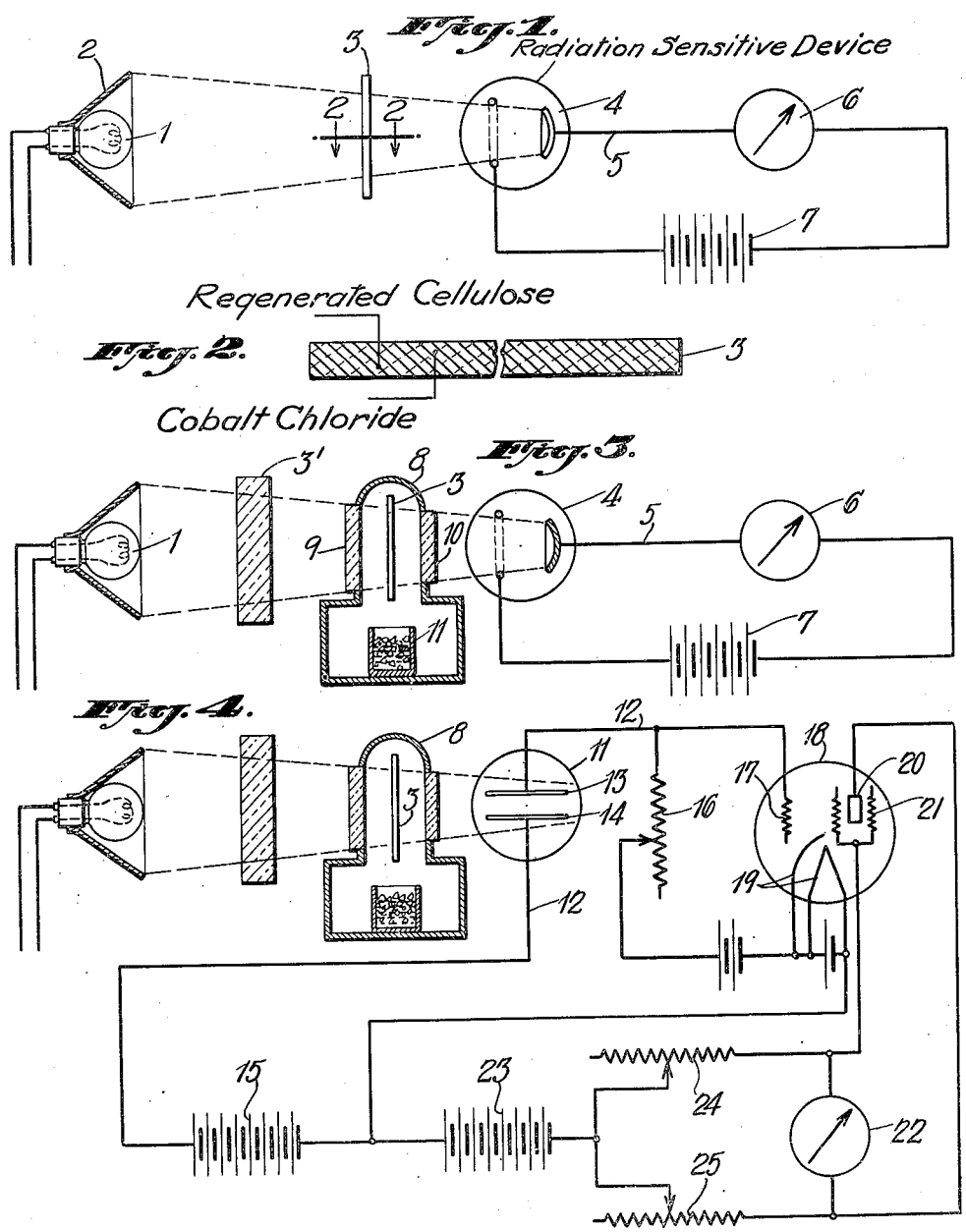

2,109,235

UNITED STATES PATENT OFFICE 2,109,235

RADIATION FILTER AND METHOD FOR UTILIZING THE SAME

Hermann Kott, East Orange, N. J., assignor, by mesne assignments, to Ion Corporation, Short Hills, N. J., a corporation of New Jersey Application June 29, 1935, Serial No. 29,095

1 Claim. (Cl. 250—34)

This invention relates to radiation measuring and detecting devices and more particularly to radiation filter means for use in connection with the measuring and detecting of radiation.

One of the objects of the present invention is to provide a radiation filter for use in the detection of radiation within certain wavelength ranges. Another object is to provide means for detecting and measuring radiation within certain wavelength ranges. Still another object is to provide an improved method and means for the detection and measurement of radiation. Other objects and advantages will be apparent as the invention is more fully disclosed.

In accordance with these objects, I have discovered that cellulosic material, particularly radiation permeable cellulosic material such as regenerated cellulose, can be utilized as a radiation filter by incorporating within the cellulose a proportion of a salt such as cobalt chloride which has the property of changing its color or color intensity with respect to its moisture content. Thereafter by incorporating within the cobalt impregnated cellulose sufficient water to impart thereto a desired color intensity the material may be employed as a radiation filter.

Upon the projection of radiation through the cobalt and moisture impregnated cellulosic material upon a radiation sensitive device the said device responds to and measures the amount of such radiation which is not absorbed by the filter.

This phenomenon may be utilized in a number of different ways, and in the accompanying drawings I have illustrated several adaptations. In the drawings Fig. 1 illustrates schematically one specific embodiment of the present invention; Fig. 2 is a view along plane 2—2 of Fig. 1; Fig. 3 illustrates schematically a second specific embodiment of the present invention; Fig. 4 illustrates schematically a modification of the specific embodiment of Fig. 3; Fig. 5 illustrates schematically a second modification of the specific embodiment of Fig. 3; Fig. 6 is an enlarged schematic view of a further modification of the embodiment of Fig. 3; Fig. 7 is a view along plane 7—7 of Fig. 6; and Fig. 8 is an enlarged view of one feature of the device of Fig. 6.

Referring to Figs. 1 and 2, I have illustrated schematically as one specific embodiment of the present invention an arrangement of elements whereby the humidity or moisture content of atmospheres may be measured by utilizing the filter element of the present invention. Radiation from source 1, which may be an incandescent filament lamp as indicated, is projected as by means of reflector 2 through filter element 3 upon radiation sensitive device 4 which regulates the flow of energy in external electric circuit 5 including meter 6 and source of direct electric current 7. Radiation sensitive device 4 may be any of the well known types of photo or radiation sensitive cells or tubes heretofore proposed in the art.

Filter element 3 is comprised in accordance with the present invention preferably of regenerated cellulose impregnated with cobalt chloride. Regenerated cellulose contains a proportion of glycerine approximating 14 to 16 per cent and is characterized by the property of absorbing moisture from an atmosphere and of giving up moisture to the atmosphere relatively rapidly in response to variations in the moisture content of the atmosphere. The ultimate or equilibrium moisture content of the cellulose bears a substantially constant ratio to the humidity of the atmosphere with any given cellulosic material which can be calibrated. The effect of temperature upon this constant ratio also may be calibrated.

Accordingly, in the determination of atmospheric humidity filter element 3 may be comprised for example of a relatively thin sheet of cobalt chloride impregnated regenerated cellulose which is suspended in the atmosphere in such manner that the atmosphere will freely contact with both faces. The beam of radiation from source 1 may be focused to irradiate a relatively large surface area of the filter element and means (not shown) may be employed to focus the filtered beam upon the radiation sensitive surface of photo-electric tube or cell 4.

The amount of cobalt chloride to be impregnated in the radiation permeable cellulosic material may vary widely without departing essentially from the nature and scope of the present invention, depending upon the contemplated use thereof. In the adaptation of the filter to the use indicated in the specific embodiment of Fig. 1 the intensity of radiation and kind of radiation emitted by source 1 may control the amount of cobalt chloride required. So also the humidity range of the atmosphere may govern the amount of cobalt chloride required.

An ordinary incandescent filament lamp emits radiation of a wide range of wavelengths. The color range in filter element 3 may be made to vary with variation in cobalt chloride content and moisture content in the filter from very light rose to very dark purple thereby cutting off or filtering out radiation having wavelengths within this color band. For the purpose of measuring the variations in the humidity of the atmosphere, the degree of accuracy sought may also control the color range employed. For example, it may be desirable to obtain but three measurements such as low, medium and high humidity. In such case, the amount of cobalt chloride employed may be adjusted such that with high humidity the filter remains substantially unchanged in color; with medium humidity the filter assumes color; and with low humidity the filter takes on a very dark color.

For accurate measurement of the humidity, it is preferable to employ as a light source 1 a special lamp which emits radiation relatively high in radiation of wavelengths within the color band of the filter 3, such as a mercury arc, glow discharge, or ultra-violet lamp. Such devices are readily available on the market today. With this kind of radiation passing through filter 3 the variations incident to absorption by the filter through changes in color due to moisture absorption from the atmosphere may be readily detected and measured.

In the modification illustrated in Fig. 3 filter element 3 is enclosed within a housing 8 provided with radiation permeable windows 9 and 10 within which housing means 11 is provided whereby an atmosphere at a substantially constant humidity may be maintained. In this arrangement, filter 3 thereby is given a determined color and is permeable to radiation of wavelengths below this color range. By projecting radiation emitted from source 1 through an auxiliary filter 3' before passing the radiation through filter 3 a narrowed band of radiation wavelengths thereby may be detected and measured by the external circuit 5 including means 6 and 7. Auxiliary filter 3', for example, may exclude red and infra-red radiation and filter 3 may be colored by the humidity of the atmosphere enclosed within housing 8 to exclude all radiation above about 3100 Angstrom. Light source 1, for example, may be an incandescent filament lamp as shown or may be a tungsten-mercury arc lamp emitting relatively large quantities of radiation in the violet and ultra-violet range of wave-lengths. By the arrangement indicated in Fig. 3 relatively accurate measurement of the amount of radiation below a certain wavelength (limited by the color imparted to filter 3) emitted during any given unit or period of time by light source 1 may be determined.

In the modification illustrated in Fig. 4, the detection and measurement of the radiation is obtained by the use of a radiation sensitive device 11 and circuit means 12.

Device 11 is substantially a gaseous conduction device and comprises an enclosing radiation permeable envelop 11, a pair of spaced electrodes 13 and 14 and a pressure of ionizable gas. The electric circuit 12 includes means 15 to impress a potential upon electrodes 13 and 14 which is substantially less than the breakdown potential therebetween; and means 16 to balance the external circuit resistance with the internal resistance of the device 11 to permit the flow of a leakage current between the electrodes across the intervening gas path. This current flow is impressed upon grid 17 of thermionic amplifier device 18 containing an indirectly heated cathode 19 and a pair of anodes 20 and 21 which are electrically connected in parallel across potentiometer 22 to a source of plate voltage 23. Variable resistances 24 and 25 are provided in each plate circuit to permit the adjustment of the circuit resistances in each plate circuit so that with any given grid voltage on grid 17 the current drawn through tube 18 by both plate circuits is substantially equal and potentiometer 22 thereupon registers zero.

Thereafter, upon changing the internal resistance by tube 11 by projecting radiation therethrough in the manner indicated, the increase or decrease in current flow through device 11 varies the potential upon grid 17 which in turn alters the plate current drawn by the closer spaced plate electrode 21. This is indicated by the deflection in potentiometer 22 substantially as indicated.

In the modification indicated in Fig. 5, the external circuit 12 has been changed to provide for operation directly from an alternating current source instead of a direct current source as indicated in Fig. 4. Rectifier 26 energized by alternating current from source 27 supplies a potential of rectified current to resistance 28 provided with tap connections 29 and 30 from which potentials suitable to replace direct current sources 15 and 23 respectively may be drawn. The remaining elements are substantially the same as those heretofore described in Fig. 4.

In adapting the modifications of Figs. 4 and 5 to the detection and measurement of ultra-violet radiation, the structure indicated in Figs. 6, 7 and 8 has been devised. In Fig. 6 the radiation sensitive device 11 is shown totally enclosed by the filter heretofore identified by numeral 3, and hence is responsive to such radiation as may pass through the said filter.

To obtain this result, I comprise filter 3 of cup or closed end tubular shaped regenerated cellulose material 31, which is enclosed in a similarly shaped double walled radiation permeable housing 32 having an opening 33 in the base of the outer wall which opens into a chamber 34 enclosing a perforated container 35 which is filled with pieces or chips of regenerated cellulose. Filter 31 is impregnated with cobalt chloride as heretofore described. Chamber 34 and the double walled container 32 are sealed from the atmosphere but communicate with each other through opening 33.

The open end of the double wall container 32 is inserted in groove 36 of base element 37 wherein is concentrically located device 11. Thus assembled all radiation acting upon device 11 must pass through filter 31. The color intensity of the filter 31 is adjusted by introducing within container 32 in any convenient manner an atmosphere having a humidity which with the cobalt chloride content of the filter employed will color the filter 31 to pass radiation below about 2950 Angstrom. This atmosphere is retained therein until the filter 31 and regenerated cellulose particles in container 35 each have reached equilibrium as to water content by absorption from the atmosphere. The device then may be sealed from the atmosphere and within relatively large variations in temperature the color characteristic of the filter 31 will remain substantially constant. The particles of cellulose in container 35 act as a stabilizer as with variation in temperature they give up and absorb moisture from the atmosphere at a more rapid rate than does the cobalt impregnated filter 31.

This entire assembly of elements may be enclosed in a radiation impermeable housing 38 provided with radiation permeable window 39 preferably of quartz, and the radiation to be measured projected through the window 39 upon and through filter 31 to device 11. The current flow in device 11 is carried through terminals 40 an 41 to any of the external circuits heretofore described.

The device of Figs. 6, 7 and 8 may be widely adapted to a variety of uses. It is particularly adapted to the detection and measurement of radiation in the violet and ultra-violet range and hence is of special service and utility in therapeutic fields wherein the application of ultra-violet radiation in the irradiation of food and milk products, the curative treating of persons and the like applications often require that the quantity and kind of radiation employed be known and controlled.

Having broadly and specifically described the present invention it is apparent that many modifications and departures may be made therein without departing essentially from the nature and scope thereof, and all such modifications are contemplated as may fall within the scope of the following claim.

What I claim is:

A radiation filter comprising a double walled and domed cylindrical container having an opening in the domed outer wall thereof, a cylindrical and domed sheet of regenerated cellulose impregnated with cobalt chloride enclosed thereby, a hermetically sealed chamber closing said opening from the atmosphere said chamber enclosing a perforated container, a quantity of regenerated cellulose within said container and a gaseous atmosphere having a determined humidity enclosed within said chamber and container.

HERMANN KOTT.